United States Patent [19]

Meckel

[11] Patent Number: 4,574,147
[45] Date of Patent: Mar. 4, 1986

[54] PROCESS FOR THE PRODUCTION OF POLYURETHANES, POLYURETHANES CONTAINING TERMINAL AROMATIC AMINO GROUPS AND THEIR USE

[75] Inventor: Walter Meckel, Neuss, Fed. Rep. of Germany

[73] Assignee: Bayer Aktiengesellschaft, Leverkusen, Fed. Rep. of Germany

[21] Appl. No.: 691,593

[22] Filed: Jan. 15, 1985

[30] Foreign Application Priority Data

Jan. 19, 1984 [DE] Fed. Rep. of Germany ....... 3401753

[51] Int. Cl.$^4$ ............................................. C08G 18/10
[52] U.S. Cl. ...................................... 528/64; 528/905
[58] Field of Search .......................................... 528/64

[56] References Cited

U.S. PATENT DOCUMENTS

| | | | |
|---|---|---|---|
| 3,428,610 | 2/1969 | Klebert | 260/75 |
| 3,682,861 | 8/1972 | Radlmann et al. | 260/47 CB |
| 3,948,847 | 4/1976 | Aitken et al. | 528/49 |
| 4,224,417 | 9/1980 | Hajek et al. | 528/64 |

FOREIGN PATENT DOCUMENTS

| | | |
|---|---|---|
| 888781 | 12/1971 | Canada . |
| 0077989 | 5/1983 | European Pat. Off. . |
| 0104396 | 4/1984 | European Pat. Off. . |
| 0105146 | 4/1984 | European Pat. Off. . |
| 1122254 | 1/1962 | Fed. Rep. of Germany . |
| 2500921 | 7/1976 | Fed. Rep. of Germany . |
| 1314686 | 2/1962 | France . |
| 1044482 | 9/1966 | United Kingdom . |
| 1351773 | 5/1974 | United Kingdom . |
| 1526022 | 9/1978 | United Kingdom . |

*Primary Examiner*—Maurice J. Welsh
*Attorney, Agent, or Firm*—Gene Harsh; Joseph C. Gil; Thomas W. Roy

[57] ABSTRACT

A process for the production of a crosslinkable, predominately linear polyurethane containing terminal aromatic amino groups by reacting (A) an organic, substantially difunctional polyisocyanate, (B) a substantially difunctional polyhydroxyl compound having a molecular weight of 400 to about 6000 and/or (C) a substantially difunctional chain-extending agent having a molecular weight of 18 to about 399 and (D) a chain-terminating agent comprising a member from the group consisting of araliphatic diamines and aromatic diamines containing amino groups of different reactivity to NCO-groups, in (E) solvents which are substantially inert to the reactants, in a single-stage or multistage reaction, characterized in that component (A) is reacted with component (B) and/or (C) in an NCO:isocyanate-reactive group ratio of about 1.45:1 to 1.02:1 to form a polyurethane containing terminal NCO-groups, having a molecular weight of at least 10,000 and an NCO-content of 0.2 equivalents and 0.001 equivalents of NCO/1000 g of polyurethane, and said polyurethane is subsequently reacted with chain-terminating agent (D) in an NCO:NH$_2$-ratio of about 1:5 to 1:1.66 to form polyurethanes containing terminal aromatic amino groups.

The present invention is also directed to the products of this process and compositions containing these products and polyisocyanate crosslinking agents.

11 Claims, No Drawings

PROCESS FOR THE PRODUCTION OF POLYURETHANES, POLYURETHANES CONTAINING TERMINAL AROMATIC AMINO GROUPS AND THEIR USE

BACKGROUND OF THE INVENTION

1. Field of the Invention

The present invention is directed to a process for chain terminating high molecular weight polyurethanes by incorporating terminal aromatic amino groups. The present invention is also directed to the products of this process and compositions containing these products and polyisocyanate crosslinking agents.

2. Description of the Prior Art

The production of high molecular weight polyurethanes in solution has long been known; the products have acquired a significant market in the field of adhesives, coatings and lacquers by virtue of their outstanding properties.

Different alternatives for producing polyurethane solutions of the type in question have been described in numerous patents, for example in DE-A No. 25 00 921. The various approaches have been adopted with a view to obtaining storable solutions in the most efficient possible manner. All of these publications are directed to the problem of avoiding isocyanate excesses in the solution ultimately obtained without uncontrollably altering the solution, while at the same time enabling the solution viscosity of the polyurethanes to be specifically and rapidly adjusted to the level required for application of the polyurethanes. Although storable PUR-solutions can be obtained by reacting a mixture of compounds containing NCO-reactive groups in stages with polyisocyanates until the required viscosity is obtained, while at the same time avoiding isocyanate excesses, the process involved is of little interest from a commercial point of view due to the long reaction time towards the end of the reaction, particularly where polyols are used.

Less time-consuming processes are known which are suitable for more efficient production. These processes involve small isocyanate excesses which, on reaching the required viscosity, are reacted with an excess of diols, alkanolamines (GB-PS No. 1 351 773); alkanolamines and then epoxides (DE-A No. 25 01 987); monoalcohols (CA-PS No. 888 781); monoamines (DE-A No. 19 06 555); or monooximes (DE-A No. 31 42 706), in order to obtain storable solutions. However, when amines are used, any excess amino groups have to be reacted off, for example with monoisocyanates according to DE-A No. 25 02 921, because otherwise unstable solutions would be formed. Polyurethane products such as these are applied from solution as coatings either by drying or by coagulation (so-called one-component polyurethanes).

However, if special properties (such as solvent resistance, surface hardness or temperature stability) are required, crosslinking agents (such as polyisocyanates) are added to the polyurethane solutions before their application to produce a crosslinked polyurethane having the required properties on the substrate. The disadvantage of this procedure is that certain conditions, which are often difficult to maintain in practice, have to be satisfied if optimum properties resulting from crosslinking are to be obtained. For example, one essential requirement is the avoidance of small quantities of moisture in the PU-solutions. In some cases this necessitates expensive drying of solvents and additives (such as pigments, etc. which often contain water) or the addition of drying agents which may have an adverse effect. The mixture of polyurethane solutions and polyisocyanate crosslinking agents also has to be sufficiently stable in storage or stable at least during the processing phase. Accordingly, polyurethane solutions of the type obtained by reacting NCO-prepolymers with excess quantities of aliphatic diamines, hydrazine or polyhydrazide compounds (for example in accordance with DE-PS No. 1 157 386) are not suitable for the proposed crosslinking application because they react almost instantaneously upon the addition of polyisocyanates. It has also been proposed to use chain-terminating agents, such as aminoalcohols or diol amines. Although aminoalcohols react quickly through their primary or secondary (aliphatic) amino group, the remaining hydroxyl groups show very little reactivity and necessitate elevated crosslinking temperatures and/or increased quantities of crosslinking agent. This often leads to inadequately crosslinked products because secondary reactions of the NCO-groups, for example with water, can have a detrimental effect.

Accordingly, the object of the present invention is to provide suitable polyurethane solutions which do not have any of the disadvantages referred to above and which, in particular, may be crosslinked with polyisocyanates, even if the solution has a high moisture content. The crosslinking reaction is intended to take place easily, even at room temperature or at relatively low crosslinking temperatures, especially from solvent-free, polyurethane/polyisocyanate crosslinker mixtures. Further advantages of the invention will become apparent from the following discussion and from the results of the examples.

The main improvement in the production of readily crosslinkable polyurethanes arises from the fact that, initially, the polyurethanes are synthesized from the usual starting materials. After a relatively high molecular weight polyurethane is formed, a chain-termination reaction with certain diamines is conducted to avoid any further significant increase in molecular weight. As a result terminal aromatic amino groups are introduced into the polyurethanes where they serve as sites for further crosslinking reactions which take place easily and safely. The polyurethanes according to the invention contain certain quantities of chemically incorporated, terminal aromatic amino groups.

SUMMARY OF THE INVENTION

The present invention relates to a process for the production of crosslinkable, predominately linear polyurethanes containing NCO-reactive terminal groups from (A) organic, substantially difunctional polyisocyanates,
(B) relatively high molecular weight, substantially difunctional polyhydroxyl compounds having molecular weights of 400 to about 6000 and/or
(C) substantially difunctional, chain-extending agents having molecular weights of 18 to 399 and
(D) chain-terminating agents containing hydrogen atoms showing different reactivity to NCO-groups, in
(E) solvents which are substantially inert to the reactants, in a single-stage or multistage reaction, characterized in that component (A) is reacted with component (B) and/or (C) in an NCO:isocyanate-reactive group ratio of about 1.45:1 to 1.02:1, preferably about 1.15:1 to 1.02:1, to form a polyurethane containing terminal NCO-groups, having a molecular weight of at least 10,000 and an NCO-content of ≦0.2 equivalent of NCO/1000 g of polyurethane which are subsequently reacted with polyamines selected from the group of araliphatic diamines and/or aromatic diamines containing amino groups of different reactivity, as chain-terminating agents (D) in an NCO:NH$_2$-ratio of about 1:5 to 1:1 66 to form polyurethanes containing terminal aromatic amino groups.

The present invention also relates to readily crosslinkable polyurethanes obtained by the process described above, characterized in that the polyurethanes contain aromatically bound terminal amino groups in a quantity of ≦0.2 equivalents of terminal aromatic amino groups per 1000 g of polyurethane solids, preferably ≦0.1 equivalent and, more preferably, ≦0.033 equivalent, the preferred minimum content amounting to ≧0.001 equivalent, more preferred ≧0.01 equivalent.

Finally, the present invention relates to the use of the polyurethanes containing terminal aromatic amino groups obtained by the claimed process as the polyurethane component in two-component systems containing about 1 to 30% by weight, based on polyurethane, of polyisocyanates.

DETAILED DESCRIPTION OF THE INVENTION

The process according to the invention provides a rapid chain-termination reaction without a significant effect on viscosity after the required viscosity of the polyurethane solutions has been reached in the synthesis reaction. Additionally, the process affords an additional advantage by providing polyurethanes with reactive NH$_2$-groups. These terminal aromatic amino groups provide reaction sites for the polyisocyanates subsequently added as crosslinking agents (usually in a quantity of about 1 to 30% by weight based on the polyurethane). The rapid, intensive crosslinking is very important to their use as coatings. At the same time, the corresponding solutions are sufficiently stable in storage or remain stable at least during the processing phase. Also lower temperatures may be used during the polyisocyanate crosslinking reaction. Crosslinking may even take place at room temperature if the solvent-free coatings are left standing for prolonged periods. An intensive crosslinking does not take place at low temperatures when polyurethanes containing the usual terminal hydroxyl groups are reacted with the polyisocyanates. In that case, the NCO-water reaction, which is initiated by traces of water present in the solvents or in the pigments or by atmospheric moisture, frequently takes place more quickly. As a result, the simultaneous reaction of the remaining terminal hydroxyl groups of the polyurethanes is inadequate.

Although the viscosities of the solutions are also stabilized by termination with monofunctional compounds such as butanol or dibutylamine in accordance with the prior art, the polyurethanes do not contain reactive terminal groups, but instead contain urethane or urea groups. Accordingly, crosslinking can only be induced by the use of high temperatures in order to incorporate the far less reactive urethane and/or urea groups through allophanate or biuret reactions. Temperatures as high as these are uneconomical and occasionally damage the polyurethanes or the substrate to be coated (for example leather or skiver).

On the other hand, the terminal group modification according to the invention effectively and specifically facilitates crosslinking with the preferred aromatic polyisocyanates added as crosslinking agents to the two-component polyurethanes. However, by virtue of the very small quantities of modifying diamines, it does not affect the structure of the polyurethanes which is determined by the starting components (A) to (C) and by the synthesis processes for the polyurethane.

Through the choice of the terminating diamines (D), the polyurethanes modified in accordance with the invention are coordinated in their reactivity with respect to the polyisocyanate crosslinkers in such a way that the mixtures of polyurethanes and polyisocyanates are sufficiently stable in storage or remain stable during the processing phase. If, by contrast, chain terminators which provide aliphatic amino groups or terminal hydrazide groups are used in accordance with the prior art, an almost instantaneous reaction can take place with the polyisocyanate crosslinkers with gelatinization of the solution. The same applies when the polyurethane containing terminal amino or hydrazide groups is synthesized by reacting NCO-prepolymers with a small excess of aliphatic diamines or dihydrazide compounds. The reaction which begins relatively quickly, even with aliphatic diisocyanates, has been used for the synthesis of relatively high molecular weight polyurethanes in solution (DE-PS No. 1 157 386).

The reaction according to the invention of relatively high molecular weight polyurethanes containing terminal NCO-groups and having molecular weights of >10,000 with the chain-terminating agents according to the invention, preferably based on araliphatic diamines or aromatic diamines containing amino groups of different reactivity, also results in polyurethane solutions which are stable in solution and which do not undergo rapid thickening or precipitation from the solvents. Amino-terminated compounds having molecular weights of up to 6000 of the type formed by reacting low molecular weight preadducts containing NCO-groups with excess diamines (DE-B No. 16 94 152, column 3 and 4) are not sufficiently stable in solvents and, for that reason, are used for other purposes according to DE-B No. 16 94 152.

In the process according to the invention, the polyaddition reactions (by which polyurethanes are synthesized) are terminated after a molecular weight of 10,000 is obtained by the addition of the chain-terminating agents according to the invention. Beyond the above-mentioned limit, however, it is possible to produce polyurethanes having the same gross composition corresponding to the starting components, but a different chain length (different molecular weight beyond molecular weights of 10,000) and different properties resulting therefrom. In principle, it is possible to synthesize solutions having concentrations of about 10 to 70% by weight with viscosities in the range of about 500 to 80,000 mPa.s, preferably about 2000 to 60,000 mPa.s at room temperature. However, polyurethane solutions which have concentrations of about 20 to 60% by weight and viscosities of about 2000 to 50,000 mPa.s are preferred.

The polyurethanes containing terminal NCO-groups and having a molecular weight of at least 10,000 (corresponding to an NCO-content of ≦0.84% or a terminal group content of ≦0.2 equivalent of terminal NCO-groups per kg of polyurethane), which are to be reacted with the chain-terminating agents in accordance with the invention, are synthesized from the usual starting materials, preferably in solution, by processes known in principle based on a single-stage or multistage reaction.

Suitable organic polyisocyanates are substantially difunctional diisocyanates such as aliphatic, cycloaliphatic, araliphatic, aromatic or heterocyclic polyisocyanates having an NCO-functionality of preferably 2 of the type described by W. Siefken in Liebigs Annalen 562, 75 (1948) and of the type mentioned as preferred diisocyanate components in DE-OS No. 29 29 501. Preferred polyisocyanates are diphenylmethane-4,4′-, -2,4′- and/or -2,2′-diisocyanate, tolylene-2,4- and/or -2,6-diisocyanate, p-phenylene diisocyanate, 3,3′-dimethyldiphenyl-4,4′-diisocyanate, mono- or tetra-$C_1$-$C_4$-alkyl-substituted diphenylmethane-4,4′-diisocyanates, naphthalene-1,5-diisocyanate and also aliphatic or cycloaliphatic diisocyanates such as hexamethylene diisocyanate, trimethyl hexamethylene diisocyanate, lysine methyl ester diisocyanate, dicyclohexylmethane-4,4′-, -2,4′- and/or -2,2′-diisocyanate, the hexahydrotolylene diisocyanates, dicyclohexyldiisocyanates and isophorone diisocyanate.

It is also possible if desired to use small quantities ($\leq 5$ mole percent) of higher functional isocyanates such as benzene-1,3,5-triisocyanate, polyphenyl-polymethylene polyisocyanates and the type described in GB-PS Nos. 874 430 and 848 671, polyisocyanates containing biuret groups, polyisocyanates containing urethane groups, polyisocyanates containing isocyanurate groups or higher polyfunctional polyisocyanates obtained by reacting trifunctional or higher low molecular weight polyols with excess quantities of diisocyanates.

Any of the relatively high molecular weight polyhydroxyl compounds normally used in the production of polyurethanes may be used as the relatively high molecular weight, substantially difunctional polyhydroxyl compounds having molecular weights of about 400 to 6000. Typical representatives are mentioned in DE-A No. 29 20 501 and include relatively high molecular weight polyesters, polyester amides, polyethers, polyacetals and polycarbonates, preferably having molecular weights of about 800 to 3000, and other compounds containing approximately 2 hydroxyl groups and having a molecular weight in the above-mentioned range.

The hydroxyl-containing polyesters suitable for use in the process according to the invention are reaction products of polyhydric, preferably dihydric alcohols with polybasic, preferably dibasic carboxylic acids, carboxylic acid esters and/or carboxylic acid anhydrides. Hydroxy carboxylic acids or lactones such as caprolactone may also be used. Suitable polyesters are also described, for example, in Houben-Weyl, Vol. XIV/2, pages 12 to 29, Thieme Verlag, Stuttgart, 1963.

The polycarboxylic acids may be aliphatic, cycloaliphatic, aromatic or heterocyclic. Examples of carboxylic acids and derivatives thereof are oxalic acid, malonic acid, succinic acid, glutaric acid, adipic acid, pimelic acid, suberic acid, azelaic acid, sebacic acid, maleic acid, fumaric acid, phthalic acid, isophthalic acid, terephthalic acid, diethyl succinic acid and 1,4-cyclohexane dicarboxylic acid.

Suitable alcohol components include ethylene glycol, diethylene glycol, triethylene glycol, 1,2- and 1,3-propane diol, 1,4-, 1,3-, 1,2- and 2,3-butane diol, 1,5-pentane diol, 1,6-hexane diol, 1,8-octane diol, neopentyl glycol, 1,4-bis-(hydroxymethyl)-cyclohexane, 2-methyl-1,3-propane diol and alkoxylated bisphenols or hydrogenation products thereof corresponding to the following general formulae

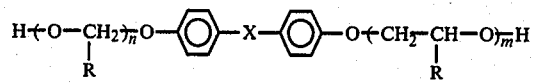

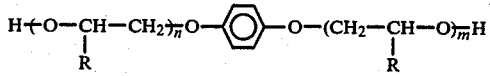

wherein
X represents $R_1$-C-$R_2$, $SO_2$ or N-$R_3$.
n and m=2–6
R represents H or $CH_3$,
$R_1$ and $R_2$ may be the same or different and represent hydrogen,
$C_1$-$C_6$-alkyl radicals, or $R_1$ and $R_2$ together with C may represent a cycloaliphatic hydrocarbon ring containing 5 to 6 carbon atoms.

Higher functional polyols such as glycerol, trimethylol propane, 1,2,6-hexane triol, 1,2,4-butane triol, pentaerythritol or sorbitol may also be used in small quantities ($\leq 5$ mole percent). Polyesters containing some double or triple bonds of unsaturated fatty acids may also be used as well as polyesters or mixed polyesters of lactones such as $\epsilon$-caprolactone, or hydroxy carboxylic acids such as $\omega$-hydroxycaproic acid.

Polyester amides suitable for use in the described process are formed when the dihydric alcohol used to prepare the polyesters is partly replaced by aminoalcohols, diamines or polyamines, preferably ethanolamine or ethylene diamine.

According to the invention, other suitable polyhydroxy compounds of relatively high molecular weight are linear or slightly branched polyethers preferably containing two hydroxyl groups such as tetrahydrofuran polymers or adducts of alkylene oxides with starter compounds. Suitable alkylene oxides include ethylene oxide, propylene oxide, butylene oxide, styrene oxide and epihalohydrins. The starter components used are compounds containing labile hydrogen atoms such as water, alcohols, amines and include those suitable for preparing the polyesters, particularly ethylene glycol, 1,2- and 1,3-propylene glycol, 2,2-bis-(4-hydroxyphenyl)-propane and aniline.

Other suitable polyhydroxyl compounds are polyacetals of the type obtained by condensing formaldehyde or any other aldehyde with polyhydric alcohols of the described type.

Particular preference is given to polycarbonates known per se of the type obtained from the previously mentioned diol components, particularly 1,6-hexane diol, and diphenyl carbonate or phosgene.

Compounds which react substantially difunctionally with isocyanates and which have molecular weights of 18 to 399, preferably from 62 to 254, are used as the low molecular weight chain-extending agents containing labile hydrogen atoms (Zerewitinoff-active hydrogen atoms). Low molecular weight diols and also aminoalcohols or diamines are suitable as well as mixtures of the chain-extending agents or a step-by-step reaction with different chain-extending agents.

Chain-extending agents suitable for use in accordance with the invention include diols or mixtures thereof such as ethylene glycol, 1,2- and 1,3-propane diol, 1,4-, 1,3-, 1,2- and 2,3-butane diol, 1,5-pentane diol, 1,6-hexane diol, neopentyl glycol, 1,4-bis(hydroxymethyl)-cyclohexane, 2-methyl-1,3-propane diol, di-, tri- or tetraethylene glycol, di-, tri-, or tetrapropylene glycol; alkoxylated bisphenols or their hydrogenation products of the type described above as diol components for the production of polyesters; or ester diols such as for example hydroxy pivalic acid/neopentyl glycol ester.

Higher functional polyols such as trimethylol propane may also be used, preferably in quantities of $\leq 5$ mole percent. Aminoalcohols such as ethanolamine, N-methyl diethanolamine or 3-aminopropanol may also be used.

Other suitable chain-extending agents include aliphatic or cycloaliphatic diamines such as ethylene diamine, tetramethylene diamine, 1,6-hexamethylene diamine, 1,12-dodecamethylene diamine, 1-amino-3-aminomethyl-3,5,5-trimethyl cyclohexane, 2,4- and 2,6-hexahydrotolylene diamine, 2,4'- and 4,4'-diaminodicyclohexylmethane, 1-amino-2-aminomethyl-3,3,5(3,5,5)trimethyl cyclopentane, tolylene diamine, p-xylylene diamine, 4,4'-diaminodiphenyl-methane, hydrazine, methylhydrazine, N,N'-dimethylhydrazine and their homologs.

Aromatic diamines or water are preferred not as the sole chain-extending agent because they provide polyurethanes which discolor relatively quickly under the effect of light and oxygen.

Detailed examples of these starting materials according to the invention (polyisocyanates, relatively high molecular weight polyhydroxyl compounds, low molecular weight chain-extending agents and, optionally, catalysts, auxiliaries and additives) are given in DE-A No. 28 54 384 and U.S. Pat. No. 4,331,778 which is herein incorporated by reference in its entirety.

In the process according to the invention, the polyurethane solutions are preferably produced by adding the polyisocyanates to a solution of the relatively high molecular weight polyols and/or low molecular weight chain-extending agents in part of the solvent. As the reaction progresses and the viscosity of the reaction mixture increases, the remainder of the solvent is added in portions for dilution to the final concentration required. The reaction is continued until the polyurethane contains at least 0.2 equivalent of NCO/1000 g of polyurethane. The polyurethane is then terminated in accordance with the invention and converted into a polyurethane containing terminal aromatic amino groups. The reaction temperatures are generally about 30° to 130° C. and preferably about 50° to 100° C.

Alternatively, it is possible to use a two-stage process by initially reacting the relatively high molecular weight polyols and, optionally, low molecular weight diols with the diisocyanates in the melt or in a portion of the solvent. The polymer chain is then extended and the viscosity increased with the low molecular weight chain-extending agents mentioned above. If necessary, the reaction mixture is diluted to the final concentration required in the same way as described above.

In a preferred process, the relatively high molecular weight polyols are initially reacted with an excess of the polyisocyanate to form an NCO-prepolymer which is then extended with glycols such as 1,4-butane diol and/or (in stages) with diamines such as isophorone diamine or N-(β-hydroxyethyl)-ethylene diamine, until the required polyurethane, which contains NCO-groups for the termination reaction according to the invention, is obtained.

In a particularly preferred process a relatively high molecular weight polyhydroxyl compound, a polyisocyanate and a diol chain-extending agent are reacted, optionally in the presence of solvent, in one or more stages to form an NCO-terminated polyurethane having a relatively high molecular weight and also a relatively high viscosity. The percentage of the diol chain-extending agent generally amounts to >80% of the total chain-extending component. By adding (cyclo)aliphatic diamines in small quantities the viscosity of the solution may be rapidly increased to the required level by producing a polyurethane still containing NCO-groups and having a molecular weight of $\geq 10,000$. It is then subjected to the termination reaction according to the invention.

The polyurethanes or polyureas still containing NCO-groups thus produced should have an average molecular weight above 10,000. The average molecular weight is calculated in accordance with the following equation:

$$\text{Average molecular weight} = \frac{f \cdot 42 \cdot \% \text{ solids}}{\% \text{ NCO of the solution}}$$

where f is the functionality of the polyurethane and is preferably about 2. The functionality may be slightly greater or slightly less than 2 depending upon the starting materials. The total functionality of the polyurethane may be between about 2.2 and 1.95, although it is preferably within narrower limits, i.e. between about 2.05 and 1.98 and, more preferably about 2. The functionality of the polyurethane solution is calculated from the components using the equation preceding the Examples in DE-A No. 32 27 679. However, the functionality of the polyurethane is limited by the fact that the NCO-containing polyurethane intermediate stage must always remain soluble in the solvents for the polyurethane within the desired concentration ranges. Functionality may be varied within the limits indicated according to the concentration and adjusted viscosity of the solutions. During the production of the NCO-terminated polyurethane intermediates, the concentration and viscosity are preferably adjusted to the respective levels subsequently required for application or, alternatively, solutions of relatively high concentration are prepared and are subsequently diluted to their processing viscosity before application.

Before the chain termination reaction according to the invention, the NCO-content in the NCO-containing polyurethane intermediates should amount to $\leq 0.84\%$ NCO, based on PU-solids which corresponds to $\leq 0.2$ equivalents of NCO per 1000 g of polyurethane solids (calculated for a functionality of 2.0). The NCO-content preferably amounts to $\leq 0.42\%$ NCO, which corresponds to $\leq 0.1$ equivalents of NCO per 1000 g of PU and, more preferably, to $\leq 0.14\%$ NCO, which corresponds to $\leq 0.033$ equivalents of NCO per 1000 g of polyurethane. The lower limit of the NCO-content of the PU intermediate is about 0.00466% NCO, which corresponds to about 0.001 equivalents of NCO per kg of polyurethane, but is preferably $\geq 0.014\%$ NCO which corresponds to $\geq 0.0033$ equivalents per 1000 g of polyurethane and, more preferably $\geq 0.028\%$ NCO which corresponds to $\geq 0.0066$ equivalents per 1000 g of polyurethane, or even 0.042% NCO which corresponds to $\geq 0.01$ equivalents per 1000 g of polyurethane.

The solvents used for the polyurethanes are the usual inert solvents commonly used for polyurethane-forming reactions such as tetrahydrofuran, dioxane, ethylacetate, methylethyl ketone, butyl acetate, toluene, and also the more polar solvents such as dimethyl formamide or dimethyl acetamide. However, the readily volatile ethers or esters and hydrocarbons of the type mentioned above are preferred.

Araliphatic diamines and/or aromatic diamines containing $NH_2$-groups of different reactivity, are used as chain-terminating agents (D) for reaction with the relatively high molecular weight polyurethanes still containing small quantities of NCO-groups. The different reactivity of the aromatic diamines is produced by steric hindrance or by deactivation with electron-withdrawing substituents.

The chain-terminating agents used include araliphatic polyamines and preferably diamines corresponding to formulae I and/or II below:

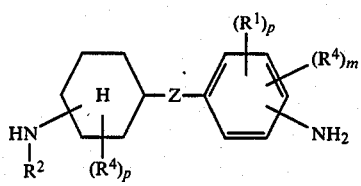

wherein

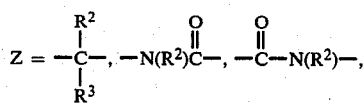

and preferably —$CH_2$— or —$C(CH_3)_2$—;
$R^1$ represents optionally branched $C_1$-$C_{13}$-alkyl,

or halogen,
$R^2$ represents H or optionally branched $C_1$-$C_6$-alkyl;
$R^3$ represents H, aryl or optionally branched $C_1$-$C_6$-alkyl;
$R^4$ represents optionally branched $C_1$-$C_6$-alkyl;
m=0, 1, 2 or 3;
p=0 or 1; and
in formula (I), (m+p)=0, 1, 2, 3 or 4; or

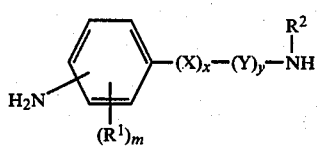

wherein
X represents —$CH_2$—$CH_2$—$CH_2$— or, provided that y≠zero, —NH—, —$NR^4$—, —O— or —S—;
x=0 or 1;
Y represents —$(CH_2)_o$— or

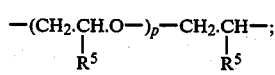

o=zero or an integer of from 1 to 6;
p=zero or an integer of from 1 to 6;
y=0 or 1; and
$R^5$ represents H or methyl.

Aromatic polyamines corresponding to formulae (III) or (IV), which contain amino groups of different reactivity (because of steric hindrance or electron-withdrawing substituents), are also suitable:

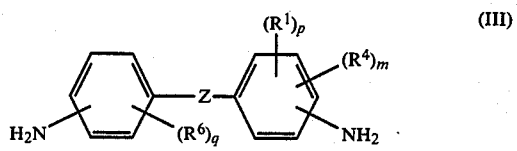

$R^6$ represents $C_1$-$C_3$-alkyl which is not adjacent to the $NH_2$-group;
m=0, 1, 2 or 3;
p=0 or 1 and (m+p)=1, 2, 3 or 4; and
q=0 or 1 and (m+p)−q ≧1; or

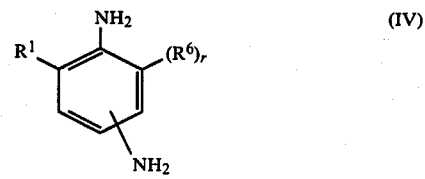

(The second amino group is in the meta- or para-position to the first amino group; at least one adjacent position to the second amino group must remain unsubstituted.)
$R^6$=$C_2$-$C_4$-alkyl, optionally branched,
r=0 or 1; when $R^1$=$COOR_4$, r may be zero.

The activity of the less reactive, aromatic (primary) amino group may be varied within wide limits through the choice of the substituents $R^1$ and $R^4$ and/or through the sum of p and m.

Preferred araliphatic diamines correspond to the following formula

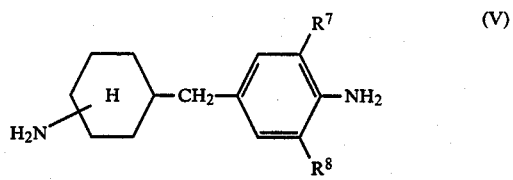

in which $R^7$ and $R^8$ may be the same or different and represent linear or branched $C_1$-$C_4$-alkyl groups.

Preferred aromatic diamines containing amino groups of different reactivity correspond to the following formula

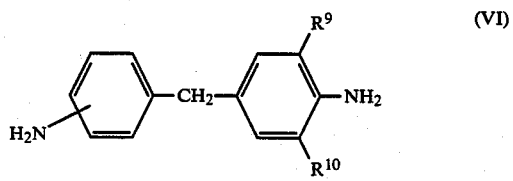

in which
$R^9$ represents linear or branched $C_1$-$C_4$-alkyl groups, —$CO_2R^4$ or halogen (F, Cl, Br or I) and $R^{10}$ represents linear or branched $C_1$–$C_4$-alkyl groups or halogen.

In formulae (II) to (VI), the substituents which were not mentioned have the same meanings as in formula (I). In cases where the substituents on the aromatic nucleus are redundant, they are replaced by a hydrogen atom although this has not been particularly characterized.

In addition to the compounds corresponding to formulae (I) to (VI), other selected compounds as shown in the following list are also suitable:

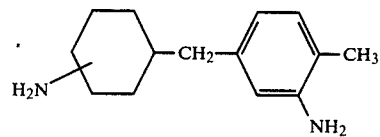
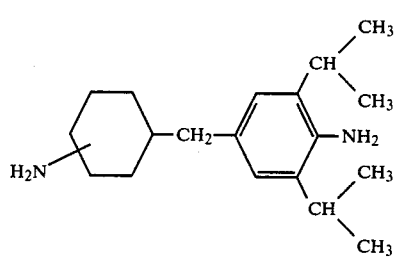
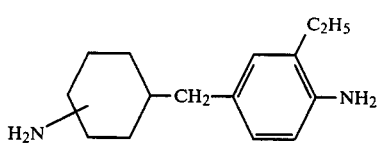
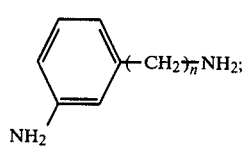
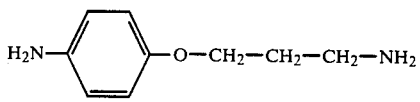
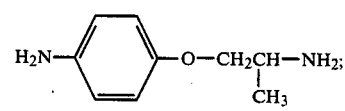
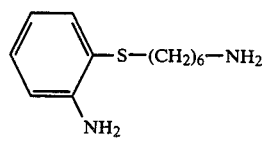
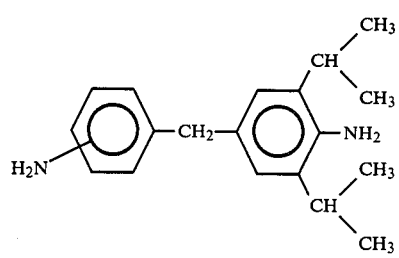
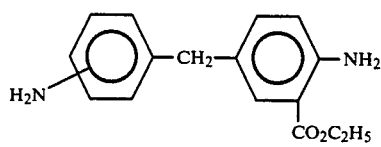
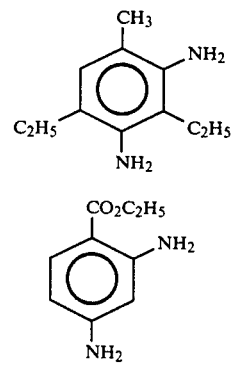

The reaction of the relatively high molecular weight polyurethane still containing NCO-groups in the quantities indicated in the form of solutions with the chain-terminating agents (D) takes place in an equivalent ratio of isocyanate groups to amino groups of about 1:5 to 1:1.66, preferably in a ratio of about 1:2.5 to 1:1.95 and, more preferably, in a ratio of about 1:2, i.e. with the theoretically equivalent quantities. Polyurethanes containing terminal aromatic amino groups are formed in this way, substantially corresponding in quantity to the terminal NCO-groups in the already relatively high molecular weight polyurethane with its minimum molecular weight of 10,000.

When the reaction takes place in a molar ratio of about 1:1.66 to 1:2, the chain-terminating agents may continue to react in difunctional form, which is sometimes desirable in cases where it is intended to make a slight upward correction to the viscosity of the solution where the reaction is carried out in ratios of about 1:2 to 1:5, free diamines inevitably remain in the solution. Since the overall content of chain-terminating diamines is extremely low, these small quantities of free aromatic diamines of type (D) in the solution are of no consequence. They react smoothly when mixed with polyfunctional polyisocyanates at the subsequent application stage and are incorporated into the crosslinked polymer. When araliphatic diamines are used as the chain-terminating agents, it is preferred to use the chain-terminating agent in a substantially equivalent ratio (1:2). When chain-terminating diamines in which the differences in the reactivity of the amino groups are smaller, it is of advantage to use quantities above 1:2 (and up to about 1:5) in order to counteract a possibly undesirable chain-extending reaction which may be initiated by the less reactive amino groups.

The high molecular weight polyurethanes thus obtained after the chain termination reaction contain aromatic terminal groups in quantities substantially corresponding to the NCO-groups previously present and, optionally, very small quantities of the excess diamines when excesses have been used. Nevertheless, the solutions are stable in viscosity and do not undergo the degradation which may occur with aliphatic amines.

The polyurethanes containing terminal aromatic amino groups show substantially the same properties as the polyurethanes corresponding to synthesis components (A), (B) and (C). The very small quantity of aromatic amino groups has hardly any effect upon the light stability of the polyurethanes and these groups provide crosslinking sites for polyisocyanates.

It is of course possible to add to the solutions the usual additives such as UV-stabilizers, oxidation inhibitors, light stabilizers, lubricants, fillers, dyes, silicon derivatives or other soluble polymers and pigments or short-staple fibers. The polyurethanes containing terminal aromatic amino groups obtained by the process according to the invention may be processed in the usual way for one-component polyurethanes, for example as coatings. However, they are preferably used in two-component polyurethane systems by the addition of about 1 to 30% by weight, preferably about 2 to 25% by weight, based on polyurethane, of more than difunctional polyisocyanates. Polyisocyanates such as these are aliphatic or cycloaliphatic, preferably aromatic polyisocyanates having a functionality of more than about 2.5 and preferably of $\geq 3$, for example biuret triisocyanates or trimers of hexamethylene diisocyanate or isophorone diisocyanate, trimeric tolylene-2,4-diisocyanate, mixed trimers of hexane diisocyanate and tolylene diisocyanate, reaction products of tolylene-2,4-diisocyanate with triols or polyols such as trimethylol propane, or polyfunctional polynuclear polyisocyanates based on polyamines from the condensation of aniline with formaldehyde.

In cases where particular effects are required in the crosslinking of the polyurethanes obtainable in accordance with the invention, it is possible to add to the two-component polyurethane solutions other polymers such as cellulose acetobutyrates, nitrocellulose, hydroxyl-containing vinylchloride/vinylacetate copolymers, hydroxy-containing acrylates or polyvinyl chloride, or other modifying polyurethane reaction components such as hydroxy polyesters of relatively high functionality, or even other aromatic polyamines such as 4,4'-diaminodiphenylmethane, 4,4-diamino-3,5-diisopropyl diphenylmethane or 2,4-diamino-3,5-diethyl toluene.

The crosslinking polyisocyanates mentioned above may be stirred into the solutions without any significant increase in viscosity occurring over a processing time of a few hours or, in some cases, a few days. However, even in continuous coating processes, the polyisocyanates may optionally be continuously introduced in the intended mixing ratio just before application.

Removal of the solvents is followed or accompanied by crosslinking in the required manner which is relatively unaffected by traces of water in the solvents and which leads to safe reaction of the polyurethanes containing terminal amino groups with crosslinking polyisocyanates and reaction products which are formed, for example, by reaction with atmospheric moisture. The necessary crosslinking temperatures are distinctly reduced by comparison with hydroxyl-terminated polyurethanes while the crosslinking density and the properties dependent thereon are improved. Crosslinking occurs after removal of the solvents and, in the event of prolonged storage, even at temperatures as low as room temperature. In overall terms, the crosslinking effects are distinctly more favorable than in the case of the known hydroxyl-terminated polyurethanes. Accordingly, polyurethane preparations of the type in question are preferably used for coating textile substrates (woven fabrics, knitted fabrics or nonwovens), particularly heat-sensitive textile substrates or leather, or as adhesives, particularly for heat-sensitive plastic substrates.

The invention is further illustrated, but is not intended to be limited by the following examples in which all parts and percentages are by weight unless otherwise specified.

EXPERIMENTAL SECTION

Example 1

1241 g of a polyester of adipic acid and 1,4-butane diol (OH number 122, acid number <0.9) were dehydrated for 1 hour at 100° C. in a water jet vacuum. 4900 g of tetrahydrofuran were added. Following the addition of 121.5 g of 1,4-butane diol, 737.3 g of 4,4'-diisocyanatodiphenylmethane were added. After catalysis with 12.5 ppm (based on polyester) of dibutyl tin dilaurate, the reaction was carried out at 50 to 55° C. until a constant NCO-value was obtained (0.22% in the solution after 19 hours, corresponding to 0.73% NCO in the PU solid).

600 g samples of the NCO-prepolymer were chain-extended to a level of 75% of the theoretical with a 10% solution of 1-amino-3,3,5-trimethyl-5-aminomethyl cyclohexane in tetrahydrofurane. The solutions obtained had a viscosity of 30,000 mPa.s at 25° C. and an NCO-content of 0.055% based on PU-solution which corresponds to 0.183% NCO based on PU solid. According to the above equation, this corresponds to an average molecular weight of about 45,000.

The solutions were chain-terminated as set forth in Table 1 and diluted with tetrahydrofuran to a solids content of 20%.

TABLE 1

| Chain-terminated according to the invention with | all diamine terminators used in an NCO:NH$_2$-ratio of 1:2 (different ratio used in 1 I) | $\eta 25°$ C./20% in THF mPa.s | |
|---|---|---|---|
| | | after preparation | after 1 month |
| 1A 2.06 g of 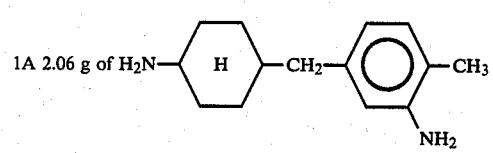 | | 2070 | 2400 |

TABLE 1-continued

| Chain-terminated according to the invention with | all diamine terminators used in an NCO:NH₂-ratio of 1:2 (different ratio used in 1 I) | $\eta 25°$ C./20% in THF mPa.s | |
|---|---|---|---|
| | | after preparation | after 1 month |
| 1B 2.66 g of 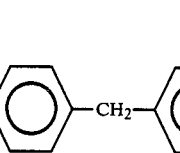 | | 3300 | 2800 |
| 1 I 5.3 g of 2,4-diamino-dodecylbenzene | (1:4) | 2200 | 2300 |
| Comparison Examples | | | |
| 1C 0.77 g of 1,4-butane diol | | 2400 | 5600 |
| 1D 0.39 g of ethanol | | 2370 | 6100 |
| 1E 1.1 g of dibutylamine | | 1710 | 1900 |
| 1F 0.83 g of butanone oxime | | 1680 | 1800 |
| 1G 0.71 g of N—methyl ethanolamine | | 2400 | 2800 |
| 1H 1.70 g of 4,4'-diaminodiphenylmethane | | 4800 | 5700 |

Example 1K (Comparison)

Example 1 was repeated with the exception that 747.3 g of diisocyanatodiphenylmethane were used instead of 737.3 g. The PU-solution obtained had a (stable) final NCO-value of 0.31%, corresponding to an average molecular weight of only about 8100. 600 g of the prepolymer were chain-terminated with 9.65 g of the following araliphatic diamine

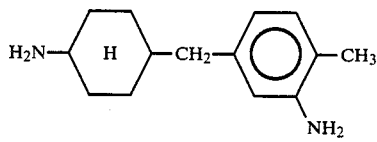

and diluted with tetrahydrofuran to a solids content of 20%. The 20% solution had a viscosity of 250 mPa.s at 25° C. and thickened into a paste after storage for 1 week at room temperature. The PU-solution did not show the required shelf life.

Example 2

1281 g of polytetramethylene ether glycol having an OH number of 112.2 (Polymeg 1000, a product of Quaker Oats) were dehydrated for 1 hour at 100° C. in a water jet vacuum. 4900 g of tetrahydrofuran (THF) were added. 115.3 g of 1,4-butane diol were stirred in at 40° C., followed by 703.2 g of 4,4'-diisocyanatodiphenylmethane. After the addition of 12.5 ppm of dibutyl tin dilaurate (based on polyether), the reaction was continued at 50° to 55° C. until a constant NCO-value of 0.26% was reached in the solution (5 hours).

600 samples g of the NCO-containing prepolymer which already had a relatively high molecular weight were extended with isophorone diamine to a level of 45% of the theoretical (based on the free NCO-groups), corresponding to an average molecular weight of the NCO-terminated polyurethane of approximately 17,500.

The solutions were chain-terminated as set forth in Table 2 and diluted with tetrahydrofuran (THF) to a solids content of 20%.

TABLE 2

| Chain-terminated according to the invention with | $\eta 25°$ C. (mPa.s) immediately | after 1 month |
|---|---|---|
| 2A 4.45 g of 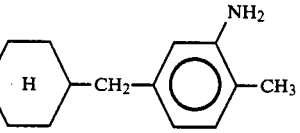 | 2600 | 2700 |
| 2B 2.66 g of 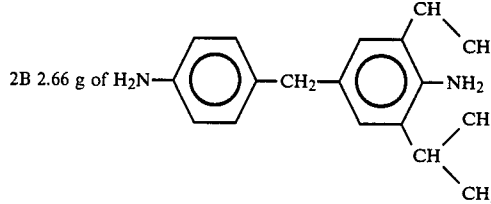 | 4300 | 4600 |
| Comparison Examples | | |
| 2C 1.84 g of 1,4-butane diol | 3700 | 5300 |

TABLE 2-continued

| Chain-terminated according to the invention with | η25° C. (mPa.s) immediately | after 1 month |
|---|---|---|
| 2D 0.94 g of ethanol | 2600 | 3100 |
| 2E 2.63 g of dibutylamine | 1800 | 1900 |
| 2F 1.78 g of butanone oxime | 2070 | 2200 |
| 2G 1.53 g of N—methyl ethanolamine | 1800 | 1900 |
| 2H 4.1 g of 4,4'-diphenylmethane | 6050 | 6800 |

Example 2K (Comparison)

Example 2 was repeated with the exception that 725 g of 4,4'-diisocyanatodiphenylmethane was used instead of 703.2 g. The PU-solution obtained had a stable NCO-value of 0.32% which corresponds to an average molecular weight for the NCO-terminated polyurethane of approximately 8000.

1100 g of the prepolymer were chain-terminated with 18.3 g of the following diamine

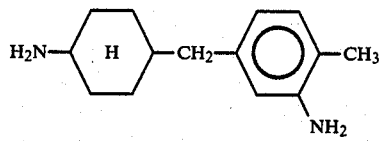

and diluted with THF to a solids content of 20%. The solution had a viscosity of 200 mPa.s at 25° C. and thickened into a paste after 3 days.

Example 3

1000 g of a polyester of adipic acid and 1,4-butane diol (OH number 50.5, acid number 0.8) were dehydrated for 1 hour at 100° C. in a water jet vacuum. After the addition of 96 g of 1,4-butane diol, 66.1 g of ethylene glycol and 4260 g of tetrahydrofuran, 670 g of 4,4-diisocyanatodiphenylmethane were added at 40° to 45° C. The temperature rose to 55° C. during the reaction. After a viscosity of approximately 30,000 mPa.s at 25° C. had been reached, the residual NCO-content was determined. The solution was then chain-terminated, followed by dilution with THF to a solids content of 20% as set forth in Table 3.

TABLE 3

| Chain-terminated according to the invention with NCO (%) | | η25° C. (mPa.s) | After 1 month |
|---|---|---|---|
| A 0.11 34.8 g of (diamine: H₂N—cyclohexyl—H—CH₂—phenyl(CH₃)—NH₂) | | 2500 (MW approx. 23,000) | 2600 |
| B 0.09 36.8 g of (diamine: H₂N—phenyl—CH₂—phenyl(CH(CH₃)₂)₂—NH₂) | | 2700 (MW approx. 28,000) | 2800 |
| D 0.13 53.0 g of (diamine: H₂N—phenyl—CH₂—phenyl(CO₂C₂H₅)—NH₂) | | 2400 | 2600 |
| E 0.10 28.4 g of (diamine: H₂N—cyclohexyl—H—CH₂—phenyl—NH₂) | | 3600 | 3900 |
| Comparison Examples | | | |
| C 0.11 14.0 g of HON=C(CH₃)(C₂H₅) | | 1950 | 2100 |
| F 0.11 9.8 g of H₂N—CH₂CH₂—OH | | 2050 | 2200 |

Example 4

A solution of 66.58 g of 1,4-butane diol and 87.29 g of 1,6-hexane diol in 180 g of THF was added dropwise to a solution of 266.1 g of a mixture of 65% of 2,4- and 35% of 2,6-tolylene diisocyanate in 800 g of tetrahydrofuran (THF) at such a rate that the exothermic reaction kept the temperature at 55° to 60° C. After 8 hours at 50° to 55° C., a constant NCO-value of 0.17% was obtained in the PU-solution.

The solution was chain-extended with 1.65 g of isophorone diamine to a level of 34% of its NCO-content, its viscosity increasing from 1000 mPa.s at 28° C. to 16,000 mPa.s at 43° C. The solution was then chain-terminated with 8.15 g of (3-amino-4-methylbenzyl)-cyclohexylamine. Dilution to a solids content of 20% gave a stable solution having a viscosity of 3950 mPa.s.

Example 5

325 g of a phthalic acid/adipic (15:85 molar ratio)ethylene glycol ester (MW 1750) and 75 g of ethylene glycol/butane diol (1:1 molar ratio)—polyadipate (MW 2000) were stirred at 80° C. with 46.0 g of a mixture of 65% of 2,4- and 35% of 2,6-tolylene diisocyanate. 192 g of ethylacetate were added dropwise as the viscosity increased. An NCO-value of 0.54% (corresponding to an average molecular weight of 10,900) was obtained after 12 hours.

The solution was chain-terminated with 18.2 g of

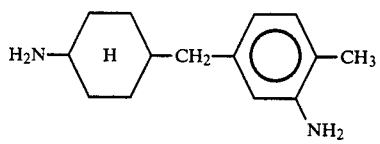

A stable solution having a viscosity of 14,000 mPa.s at 25° C. was obtained.

Example 6

254 g of a hexane diol polycarbonate (OH number 271.5) were dissolved in 980 g of tetrahydrofuran. After the addition of 166.1 g of 4,4'-diisocyanatodiphenylmethane, the temperature rose slowly to 56° C. After the slightly exothermic reaction had abated, the solution was kept at 50° to 60° C. for another 4 hours. A stable NCO-value in the PU-solution of 0.13% was obtained.

1100 g of the prepolymer were chain-extended to a level of 25% by the addition of 0.72 g of isophorone diamine, the viscosity rising directly from 4000 mPa.s at 24° C. to 12,000 mPa.s at 46° C. 5.6 g of 4-(3-amino-4-methylbenzyl)-cyclohexylamine were added for chain termination. Dilution with tetrahydrofuran to a solids content of 20% gave a stable solution having a viscosity of 2100 mPa.s.

Example 7

53.8 g of 4,4'-diisocyanatodiphenylmethane were added to 366 g of 1,4-dimethylcyclohexane polycarbonate (OH number 56.1) in 980 g of tetrahydrofuran. A stable prepolymer having an NCO content of 0.16% in the NCO-solution was obtained after 6 hours at 55° C.

1100 g of the prepolymer were chain-extended with a mixture of 0.66 g of isophorone diamine and 0.015 g of N-methyl ethanolamine, the viscosity increasing rapidly from 4300 mPa.s at 31° C. to 16,400 mPa.s at 44° C.

7.37 g of 4-(3-amino-4-methylbenzyl)-cyclohexylamine were then added for chain termination. Dilution with tetrahydrofuran to a solids content of 20% gave a stable solution having a viscosity of 2800 mPa.s.

Example 8

154.7 g of a mixture of 65% of 2,4- and 35% of 2,6-tolylene diisocyanate were added to 265 g of 2,2-bis-(4-(2-hydroxyethoxy)-phenyl)-propane in 980 g of tetrahydrofuran. After the addition of 0.5 ml of a 1% solution of dibutyl tin dilaurate in THF, the solution was heated for 28 h to 50°-60° C. A prepolymer having a constant NCO-value of 0.44%, based on the PU-solution, was obtained.

955 g of the prepolymer were chain-extended with 6.8 g of isophorone diamine, the viscosity increasing directly from 500 mPa.s at 21° C. to 18,000 mPa.s at 29° C. 4.36 g of 4-(3-amino-4-methylbenzyl)-cyclohexylamine were then added for chain termination. Dilution with THF to a solids content of 20% gave a stable solution having a viscosity of 3000 mPa.s.

Example 9

331 g of a hexane diol polycarbonate (OH number 160) were reacted at 60° C. with 89.2 g of a mixture of 65% of 2,4- and 35% of 2,6-tolylene diisocyanate in 180 g of ethylacetate. A prepolymer having a stable NCO-value of 0.45% was obtained. The prepolymer was chain-terminated with 14.0 g of 4-(3-amino-4-methylbenzyl)-cyclohexylamine and diluted to a solids content of 50%. A stable solution having a viscosity of 2500 mPa.s was obtained.

Example 10

116.8 g of a hexane diol polycarbonate (OH number 56) in 980 g of tetrahydrofuran were mixed at 50° C. with 216.7 g of a mixture of 65% of 2,4- and 35% of 2,6-tolylene diisocyanate. After the addition of 12.5 ppm (based on polyether) of dibutyl tin dilaurate, the mixture was stirred for 30 minutes. A mixture of 51.23 g of 1,4-butane diol and 35.3 g of ethylene glycol was then added dropwise. A constant NCO-value of 0.17% was obtained after 30 hours at 55° to 60° C. 1100 g of the prepolymer were chain-extended with isophorone diamine to a level of 75% of the theoretical, the viscosity increasing from 1000 mPa.s at 24° C. to 16000 mPa.s at 31° C. 2.21 g of 4-(3-amino-4-methylbenzyl)-cyclohexylamine were then added for chain termination. After dilution with THF, the solution had a viscosity of 2760 mPa.s.

Example 11

292 g of a hexane diol polycarbonate (OH number 105.8) in 980 g of tetrahydrofuran were mixed at 50° C. with 115.7 g of 4,4'-diisocyanatodiphenylmethane. After 30 minutes, 8.12 g of 1,6-hexane diol and 4.27 g of ethylene glycol were added dropwise in the form of a mixture. A constant NCO-value of 0.17% was obtained after 6 hours at 50° to 55° C. 1100 g of the prepolymer were chain-extended with isophorone diamine to a level of 10% of the theoretical, the viscosity increasing from 6800 mPa.s at 24° C. to 16000 mPa.s at 44° C. 8.75 g of 4-(3-amino-4-methylbenzyl)-cyclohexylamine were then added for chain termination. After dilution with THF to a solids content of 20%, the solution had a viscosity of 2800 mPa.s.

Water was added to the solutions to give them a water content of 0.5% and 5 g of a polyisocyanate (Desmodur L-75, a biuret polyisocyanate based on 1,6-hexamethylene diisocyanate available from Bayer AG) were stirred in per 100 g of 20% polymer solution.

Films were cast onto glass plates using a 1000 μm coating knife. The films were measured after storage for 1 week under normal conditions.

To determine the degree of crosslinking, weighed pieces of film were stored in THF for 1 hour, the increase in volume determined, the pieces of film subsequently dried and the change in weight determined. The results are shown in the following Table.

TABLE 4

| Example No. | 100% Modulus (MPa) | Tensile strength (MPa) | Elongation (%) | Increase in volume (%) | Change in weight (%) |
|---|---|---|---|---|---|
| 1A According to the invention | 24.5 | 56.2 | 250 | 270 | −1 |
| 1B According to the invention | 24.5 | 57.7 | 250 | 430 | −2.6 |
| 1C Comparison Examples | 24.5 | 60.3 | 300 | 390 | −10 |
| 1D Comparison Examples | 26.6 | 55.1 | 300 | 390 | −16.7 |
| 1E Comparison Examples | 19.4 | 66.9 | 300 | 310 | −34.1 |
| 1F Comparison Examples | 19.4 | 40.3 | 250 | 310 | −37.8 |
| 1G Comparison Examples | 20.4 | 66.4 | 250 | 430 | −14.0 |
| 2A According to the invention | 15.3 | 42.4 | 200 | 270 | 0 |
| 2B According to the invention | 13.3 | 44.0 | 250 | 270 | −1.7 |
| 2C Comparison Examples | 12.3 | 50.1 | 250 | 530 | −12.0 |
| 2D Comparison Examples | 10.2 | 46.5 | 350 | | |
| 2E Comparison Examples | 10.2 | 29.6 | 300 | almost dissolved | |
| 2F Comparison Examples | 10.2 | 37.8 | 350 | | |
| 2G Comparison Examples | 12.3 | 39.2 | 250 | 530 | −25.5 |
| 3A According to the invention | 3.0 | 42.0 | 150 | 255 | 0 |
| 3B According to the invention | 21.0 | 34.1 | 150 | 350 | 0 |
| 3C Comparison Example | 17.5 | 39.4 | 200 | 205 | −64.5 |
| 3D According to the invention | 19.5 | 43.0 | 150 | 270 | −2 |
| 3E According to the invention | 24.0 | 44.0 | 200 | 310 | −1 |
| 3F Comparison Example | 23.0 | 41.0 | 200 | 250 | −17 |
| 4 According to the invention | — | 54.7 | 50 | n.d. | −0.5 |
| 5 According to the invention | 12.5 | 51.5 | 350 | n.d. | −1.0 |
| 6 According to the invention | 33.4 | 49.0 | 200 | n.d. | −0.5 |
| 7 According to the invention | — | 47.0 | 60 | n.d. | −1.2 |
| 8 According to the invention | — | 54.6 | 10 | n.d. | −1.3 |
| 9 According to the invention | 28.7 | 53.0 | 250 | n.d. | −0.8 |
| 10 According to the invention | — | 48.5 | 30 | n.d. | −1.5 |
| 11 According to the invention | 22.1 | 55.2 | 200 | n.d. | −1 | n.d. = not determined

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a crosslinkable, predominately linear polyurethane containing terminal aromatic amino groups which comprises reacting
(A) an organic, substantially difunctional polyisocyanate,
(B) a substantially difunctional polyhydroxyl compound having a molecular weight of 400 to about 6000 and/or
(C) a substantially difunctional chain-extending agent having a molecular weight of 18 to about 399 and
(D) a chain-terminating agent comprising a member from the group consisting of araliphatic diamines and aromatic diamines containing amino groups of different reactivity to NCO-groups, in
(E) solvents which are substantially inert to the reactants,
in a single-stage or multistage reaction, characterized in that component (A) is reacted with component (B) and/or (C) in an NCO:isocyanate-reactive group ratio of about 1.15:1 to 1.02:1 to form a polyurethane containing terminal NCO-groups, having a molecular weight of at least 10,000 and an NCO-content of ≦0.2 equivalents and ≧0.001 equivalents of NCO/1000 g of polyurethane, and said polyurethane is subsequently reacted with chain-terminating agent (D) in an NCO:NH$_2$-ratio of about 1:5 to 1:1.66 to form polyurethanes containing terminal aromatic amino groups.

2. The process of claim 1 wherein said araliphatic diamine corresponds to formula I and/or II

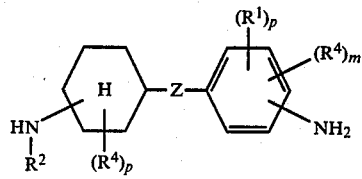

(I)

wherein
Z represents

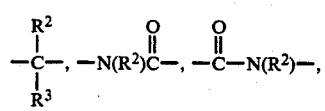

$(-S)_m-SO_2-$ or $-O-$;
$R^1$ represents optionally branched $C_1-C_{13}$-alkyl,

or halogen;
$R^2$ represents H or optionally branched $C_1-C_6$-alkyl;
$R^3$ represents H, aryl or optionally branched $C_1-C_6$-alkyl;
$R^4$ represents optionally branched $C_1-C_6$-alkyl;
m=0, 1, 2 or 3;
p=0 or 1; and (m+p)=0, 1, 2, 3 or 4; or

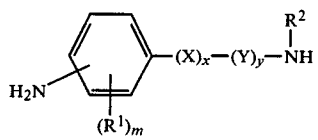 (II)

wherein

X represents —CH$_2$—CH$_2$—CH$_2$— or, provided that y≠zero, —NH—, NR$^4$—, —O— or —S—;
x=0 or 1;
Y represents —(CH$_2$)$_o$— or

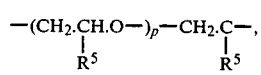

o=zero or an integer of from 1 to 6;
p=zero or an integer from 1 to 6;
y=0 or 1;
R$^5$ represents H or methyl; and
the other substituents have the same meaning as in formula I.

3. The process of claim 1 wherein said araliphatic diamine corresponds to the following formula

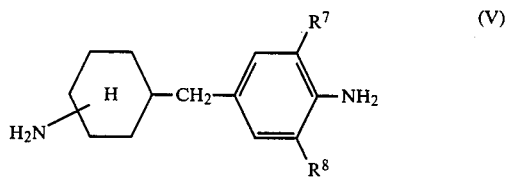 (V)

wherein R$^7$ and R$^8$ may be the same or different and represent linear or branched alkyl groups containing from 1 to 4 carbon atoms.

4. The process of claim 1 wherein said aromatic diamine containing amino groups of different reactivity corresponds to the following formula

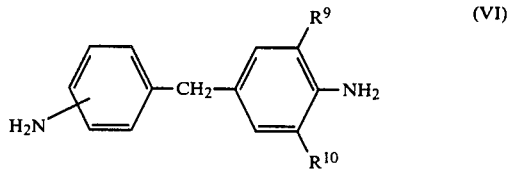 (VI)

wherein

R$^9$ represents linear or branched alkyl groups containing from 1 to 4 carbon atoms, —CO$_2$R$^4$ or halogen; and
R$^{10}$ represents linear or branched alkyl groups containing from 1 to 4 carbon atoms or halogen.

5. The process of claim 1 wherein Z represents —CH$_2$— or —C(CH$_3$)$_2$—.

6. The process of claim 3 wherein Z represents —CH$_2$— or —C(CH$_3$)$_2$—.

7. The process of claim 4 wherein Z represents —CH$_2$— or —C(CH$_3$)$_2$—.

8. The crosslinkable, predominately linear polyurethane prepared in accordance with claim 1.

9. The crosslinkable, predominately linear polyurethane prepared in accordance with claim 3.

10. The crosslinkable, predominately linear polyurethane prepared in accordance with claim 4.

11. A composition which comprises
(a) the crosslinkable, substantially linear polyurethane prepared in accordance with claim 1 and
(b) about 1 to 30% by weight, based on the weight of component (a), of polyisocyanates.

* * * * *